United States Patent
Johnson et al.

(10) Patent No.: US 10,035,261 B2
(45) Date of Patent: Jul. 31, 2018

(54) ACTUATABLE JOINT FOR A ROBOTIC SYSTEM HAVING AN AXIAL ANGULAR CONTACT ROLLER BEARING

(71) Applicant: Schaeffler Technologies AG & Co. KG, Herzogenaurach (DE)

(72) Inventors: Joseph Johnson, Mooresville, NC (US); Craig Hooker, Indian Land, SC (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 99 days.

(21) Appl. No.: 15/185,639

(22) Filed: Jun. 17, 2016

(65) Prior Publication Data

US 2017/0361458 A1    Dec. 21, 2017

(51) Int. Cl.
| | |
|---|---|
| B25J 9/08 | (2006.01) |
| B25J 9/12 | (2006.01) |
| B25J 9/00 | (2006.01) |
| B25J 9/04 | (2006.01) |
| B25J 9/10 | (2006.01) |
| F16C 19/36 | (2006.01) |

(52) U.S. Cl.
CPC ............ B25J 9/126 (2013.01); B25J 9/0009 (2013.01); B25J 9/0012 (2013.01); B25J 9/046 (2013.01); B25J 9/08 (2013.01); B25J 9/108 (2013.01); F16C 19/364 (2013.01); Y10S 901/23 (2013.01)

(58) Field of Classification Search
CPC ..... B25J 18/00; B25J 9/08; B25J 9/126; B25J 9/00
See application file for complete search history.

(56) References Cited

U.S. PATENT DOCUMENTS

| | | | | |
|---|---|---|---|---|
| 4,662,814 A | * | 5/1987 | Suzuki | B25J 9/06 414/730 |
| 4,674,993 A | | 6/1987 | Mazziotti et al. | |
| 5,523,662 A | * | 6/1996 | Goldenberg | B25J 9/06 318/568.11 |
| 6,327,773 B1 | * | 12/2001 | Rode | F16C 19/548 29/724 |

(Continued)

FOREIGN PATENT DOCUMENTS

| | | |
|---|---|---|
| WO | 2007065401 | 6/2007 |
| WO | 2008/049641 A1 | 5/2008 |

OTHER PUBLICATIONS

International Search Report for Application No. PCT/US2017/037679.
Written Opinion for Application No. PCT/US2017/037679.

Primary Examiner — William Kelleher
Assistant Examiner — Gregory T Prather
(74) Attorney, Agent, or Firm — Volpe and Koenig, P.C.

(57) ABSTRACT

An actuatable joint for a robotic system has a body, a motor positioned in the body, an output shaft configured to be rotated by the motor relative to the body, and a bearing assembly positioned between the output shaft and the body and configured to support the rotation of the output shaft. The bearing assembly has a first axial angular contact roller bearing. The roller bearing has a pair of frusto-conical bearing rings forming a pair of parallel races, a bearing cage positioned between the pair of bearing rings and including a plurality of openings, and a plurality of rollers positioned in the openings and in contact with the races.

12 Claims, 4 Drawing Sheets

(56) References Cited

U.S. PATENT DOCUMENTS

| | | | |
|---|---|---|---|
| 6,535,794 B1* | 3/2003 | Raab | B25J 9/1692 |
| | | | 33/502 |
| 8,196,492 B1* | 6/2012 | Denu | B25J 9/042 |
| | | | 414/744.5 |
| 2002/0135241 A1 | 9/2002 | Kobayashi et al. | |
| 2003/0051932 A1* | 3/2003 | Thompson | B25J 5/007 |
| | | | 180/167 |
| 2003/0197481 A1 | 10/2003 | Gonzalez | |
| 2007/0168081 A1* | 7/2007 | Shin | B25J 9/08 |
| | | | 700/245 |
| 2009/0129713 A1 | 5/2009 | Hattori | |
| 2012/0011956 A1* | 1/2012 | Lundberg | B25J 9/04 |
| | | | 74/490.03 |
| 2014/0060223 A1* | 3/2014 | Tanaka | B25J 9/06 |
| | | | 74/89 |
| 2014/0202276 A1* | 7/2014 | Song | B25J 9/046 |
| | | | 74/490.05 |
| 2014/0251056 A1 | 9/2014 | Preuss | |
| 2015/0323008 A1* | 11/2015 | Koganei | F16C 19/364 |
| | | | 384/564 |
| 2017/0014998 A1* | 1/2017 | Langenfeld | B25J 9/1638 |
| 2017/0063193 A1* | 3/2017 | Volak | F16C 19/08 |

\* cited by examiner

_US 10,035,261 B2_

ACTUATABLE JOINT FOR A ROBOTIC SYSTEM HAVING AN AXIAL ANGULAR CONTACT ROLLER BEARING

FIELD OF INVENTION

The present invention relates to a robotic system, and, more particularly, to an actuatable joint for a robotic system having an axial angular contact roller bearing.

BACKGROUND

Robots and robotic systems are often used to automate manufacturing processes. A typical robotic system may include an articulating arm configured to move through a predetermined path to perform a selected operation, such as moving or rotating an object. The articulating arm, much like a human arm, may include joints and connectors. The joints may extend, rotate, pivot, actuate, or otherwise move the connectors or a tool in order to perform the selected operation.

Current robotic systems suffer from some drawbacks because they are lacking in an ability to be customized. For example, components are typically formed through expensive casting and/or machining processes, thereby incentivizing the continued use of a component, despite any limitations it may have. Further, components of current robotic systems may be heavy and/or bulky, further inhibiting system variation and customization. The present disclosure is directed to overcoming one or more problems of the prior art through providing robotic system components that are modular, lightweight-yet-strong, and compact.

SUMMARY

In one aspect, the present disclosure is directed to an actuatable joint for a robotic system. The actuatable joint includes a body, a motor positioned in the body, an output shaft configured to be rotated by the motor relative to the body, and a bearing assembly positioned between the output shaft and the body and configured to support the rotation of the output shaft. The bearing assembly includes a first axial angular contact roller bearing. The roller bearing includes a pair of frusto-conical bearing rings forming a pair of parallel races, a bearing cage positioned between the pair of bearing rings and including a plurality of openings, and a plurality of rollers positioned in the openings and in contact with the races.

In another aspect, the present disclosure is directed to a robotic system. The robotic system includes a connector arm and an actuatable joint. The actuatable joint includes a body, a motor positioned in the body, and an output shaft configured to be rotated by the motor relative to the body. The output shaft includes a frusto-conical section defining a pair of support surfaces. The actuatable joint further includes a connector plate secured to the output shaft, and a bearing assembly positioned between the output shaft and the body and configured to support the rotation of the output shaft. The bearing assembly includes a first axial angular contact roller bearing and a second axial angular contact roller bearing, each including a pair of frusto-conical bearing rings forming a pair of parallel races, one of the bearing rings being in contact with one of the support surfaces, a bearing cage positioned between the pair of bearing rings and including a plurality of openings, and a plurality of rollers positioned in the openings and in contact with the races. The connector arm is attached to the connector plate for rotation by the motor

BRIEF DESCRIPTION OF THE DRAWING(S)

The foregoing Summary and the following detailed description will be better understood when read in conjunction with the appended drawings, which illustrate a preferred embodiment of the invention. In the drawings.

DETAILED DESCRIPTION OF THE PREFERRED EMBODIMENT(S)

Figure 1:
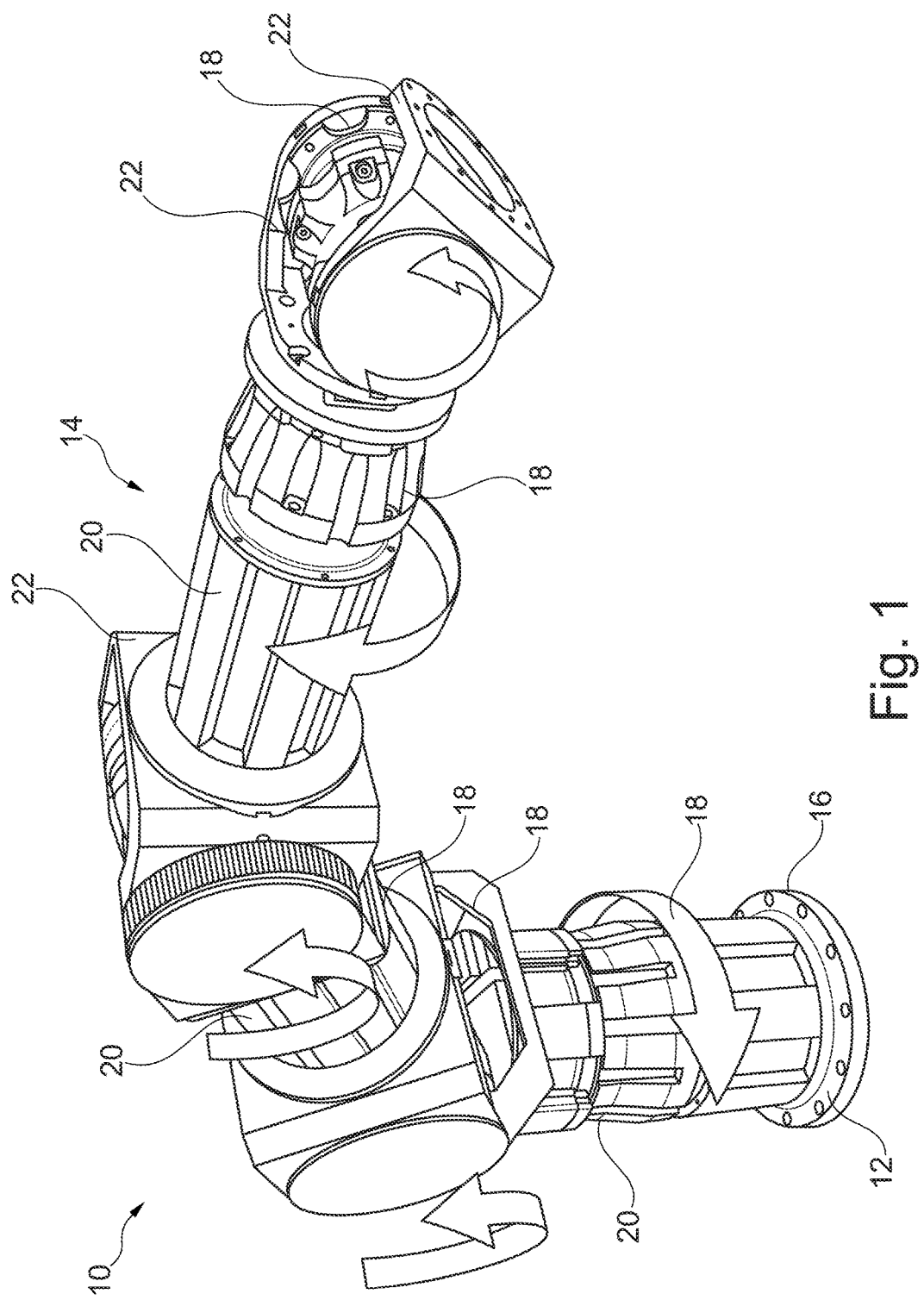
FIG. 1 is a perspective view of an exemplary robotic system.

FIG. 1 illustrates an exemplary robotic system 10. The robotic system 10 may be an automated machine configured to perform a task, such as a task in a manufacturing process. In an exemplary embodiment, the robotic system 10 includes a base portion 12 and an articulating assembly 14. The base portion 12 may be stationary, in that it may be immovably mounted or it may be stationary relative to the articulating assembly 14. For example, the base portion 12 may include a base bracket 16 secured to an underlying surface.

The articulating assembly 14 includes operable components of the robotic system 10 for completing a selected task (e.g., move or rotate an object, position a tool, etc.). For example, the articulating assembly 14 may include components configured to move through a predetermined path in order to perform the task (e.g., move or rotate an object, position a tool, etc.). Consistent with disclosed embodiments, the components of the articulating assembly 14 may be modular such that the robotic system 10 is customizable for completing a variety of different tasks (e.g., moving through any selected path).

In an exemplary embodiment, the articulating assembly 14 includes a plurality of actuatable joints 18, a plurality of connector arms 20, and a plurality of brackets 22. The joints 18 are actuatable in that they include relatively movable parts. For example, one or more of the joints 18 may be configured to rotate about an axis. In some embodiments, other joints 18 may be configured to extend, pivot, or otherwise cause relative movement. The connector arms 20 are secured between pairs of joints 18, such as to position different axes of rotation relative to each other and increase the degrees of freedom of the robotic system 10. The brackets 22 are configured as connectors, such as to allow a rotational axis of a joint 18 to be angled relative to a longitudinal axis of a connector arm 20 extending therefrom.

Figure 2:
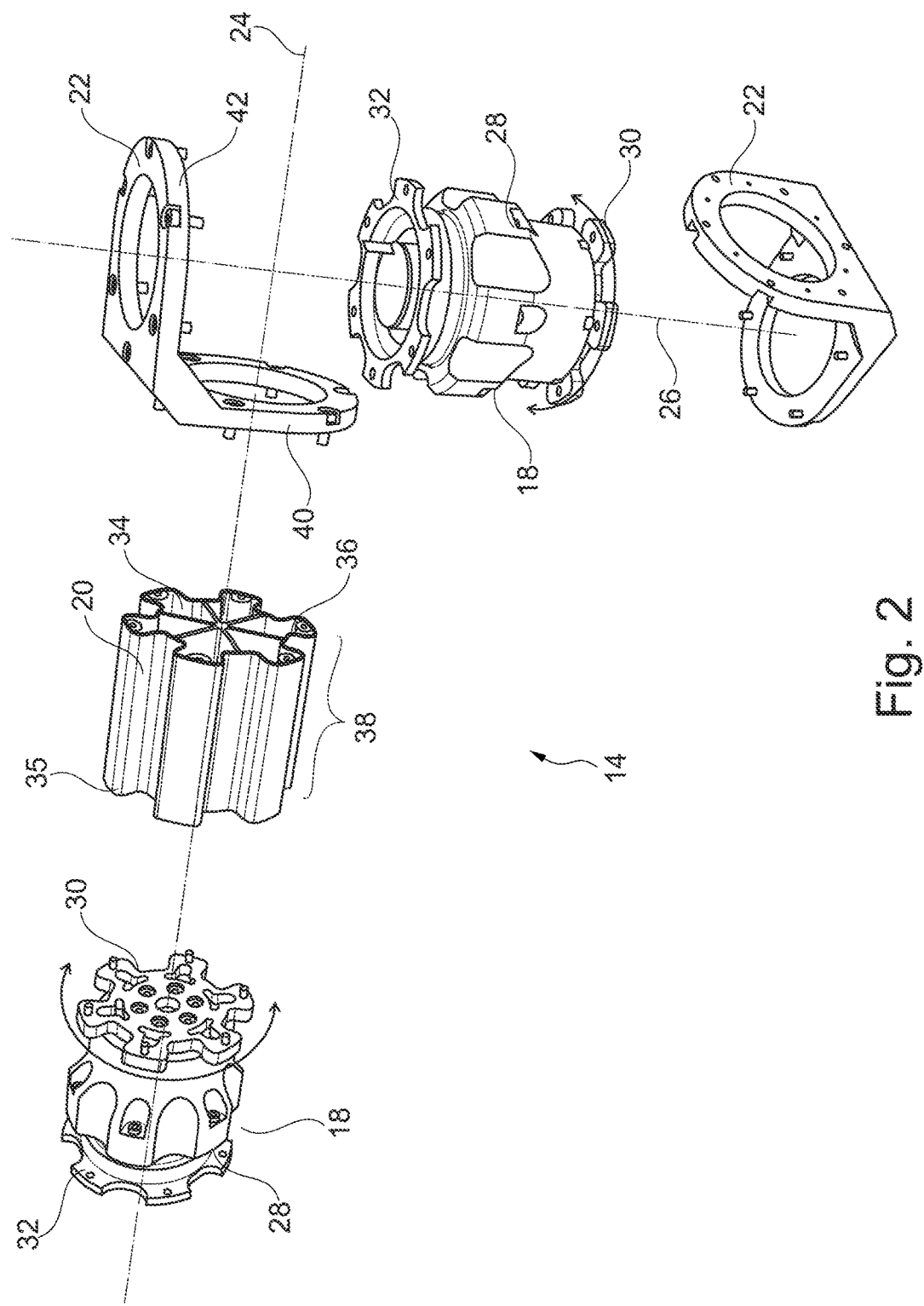
FIG. 2 is an exploded view of an exemplary articulating portion that may be used in conjunction with the robotic system of FIG. 2.

FIG. 2 further illustrates an exploded view of a possible configuration of the articulating assembly 14. The illustrated articulating assembly 14 includes a first joint 18 rotatable about a horizontal axis 24 and a connector arm 20 connectable to the first joint 18 and extending along the horizontal axis 24. The articulating assembly 14 further includes a bracket 22 configured to allow additional components of the articulating assembly 14 to extend along a vertical axis 26.

For example, the bracket 22 is also connected to a second joint 18, rotatable about the vertical axis 26. An additional bracket 22 is secured to the second joint 18, thereby allowing for additional components to be secured and additional degrees of freedom for an associated robotic system 10.

The illustrated joints 18 include relatively movable components that provide the above-described rotation. In an exemplary embodiment, each joint 18 includes a body 28 which houses internal components for rotating a connection plate 30. The joints 18 may include an additional connection plate 32 which may or may not be rotatable by the internal components of the body 28. In any case, the connection plate 30 is rotatable with respect to the other connection plate 32 such that a components secured to the connection plates 30, 32 are relatively movable to each other by the joint 18.

The connector arm 20 and brackets 22 are modular components configured to position the joints 18 and any other actuatable elements (not shown) relative to each other. The connector arm 20 includes a body portion 34 which extends longitudinally between a first end 35 and a second end 36 through a length 38, each end 35, 36 being connectable to a joint 18, a bracket 22, or another component. The bracket 22 includes a first attachment surface 40 and a second attachment surface 42, each secured to different components. The first attachment surface 40 is angled relative to the second attachment surface 42 such that the articulating assembly 14 can extend through different planes, along relatively oriented axes, such as horizontal and vertical axes 34, 36.

Regarding the connector arm 20, a value for the length 38 depends on a particular application of the articulating assembly 14 (i.e., the degrees of freedom, a movement path, a range, etc.). In order to accommodate these variable applications, the connector arm 20 is configured to be replaceable and customizable in a cost-effective manner. In an exemplary embodiment, the body portion 34 is formed from an extruded material, such as extruded aluminum, other metals (e.g., steel), a plastic material, or a ceramic material. In this way, the connector arm 20 may be cut-to-size to accommodate a particular robotic system configuration. Moreover, the extruded body portion 34 includes a geometrical configuration that allows the connector arm 20 to be lightweight-yet-strong and rigid.

Figure 3:
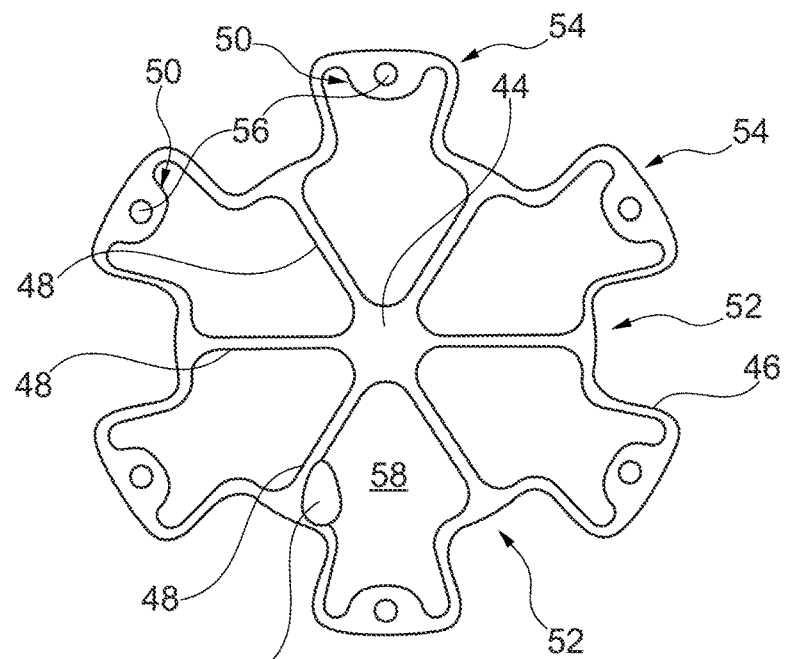
FIG. 3 is a plan view of an exemplary connector arm of the articulating portion of FIG. 2.

FIG. 3 further illustrates a cross-sectional view of the connector arm 20. In an exemplary embodiment, the connector arm 20 includes an axial base member 44, a perimeter wall 46 preferably having a toothed configuration, a plurality of webs 48, and a connection portion 50. The axial base member 42 extends on or along a corresponding longitudinal axis of the connector arm 20. The axial base member 44 may include any shape, including circular, square, rectangular, hexagonal, etc.

The perimeter wall 46 defines a perimeter shape of the connector arm 20. In an exemplary embodiment, the perimeter shape defined by the perimeter wall 46 includes a plurality of concave sections 52 alternating with a plurality of convex sections 54 to define the toothed configuration. The plurality of webs 48 extend radially from the base member 44 to the perimeter wall 46. In an exemplary embodiment, the plurality of webs are connected to inner walls of the concave sections 52.

In an exemplary embodiment, the connection portion 50 includes a plurality of attachment members 56. The plurality of attachment members 56 are preferably formed as radially-extending flanges or protrusions which define an opening for receiving a fastener. In an exemplary embodiment, the plurality of attachment members 56 are attached to inner walls of the plurality of convex sections 54. The attachment members 56 may extend only at an end portion of the connector arm 20 or may extend an entire length of the connector arm 20 such that the attachment members 56 are present at the end portions even if the connector arm 20 is cut to length.

For example, the attachment members may include axially-extending beads formed on inner walls of the convex sections 54. The beads may include pre-formed holes for receiving a fastener or may be solid such that a connection hole may be formed therein when needed.

The above-described configuration provides a lightweight but rigid construction for the connector arm 20, and which allows the body portion 34 to be formed from an extruded material. It should be understood, however, that the perimeter wall 46 and corresponding perimeter shape is not limited to the illustrated embodiment but could have alternative shapes and configurations. For example, the perimeter wall 46 may be triangular, rectangular, hexagonal, octagonal, etc.

As shown in FIG. 3, a plurality of channels 58 are defined between adjacent webs 48. The channels 58 contribute to the lightweight structure of the connector arm 20 while also providing a space for additional components of the robotic system 10. For example, at least one cable 60 connected to the actuatable joint 18 (e.g., a power cable) extends through at least one of the plurality of channels 58. This routing capability allows components, such as cable 60, to extend throughout the robotic system 10 internally.

Figure 4:
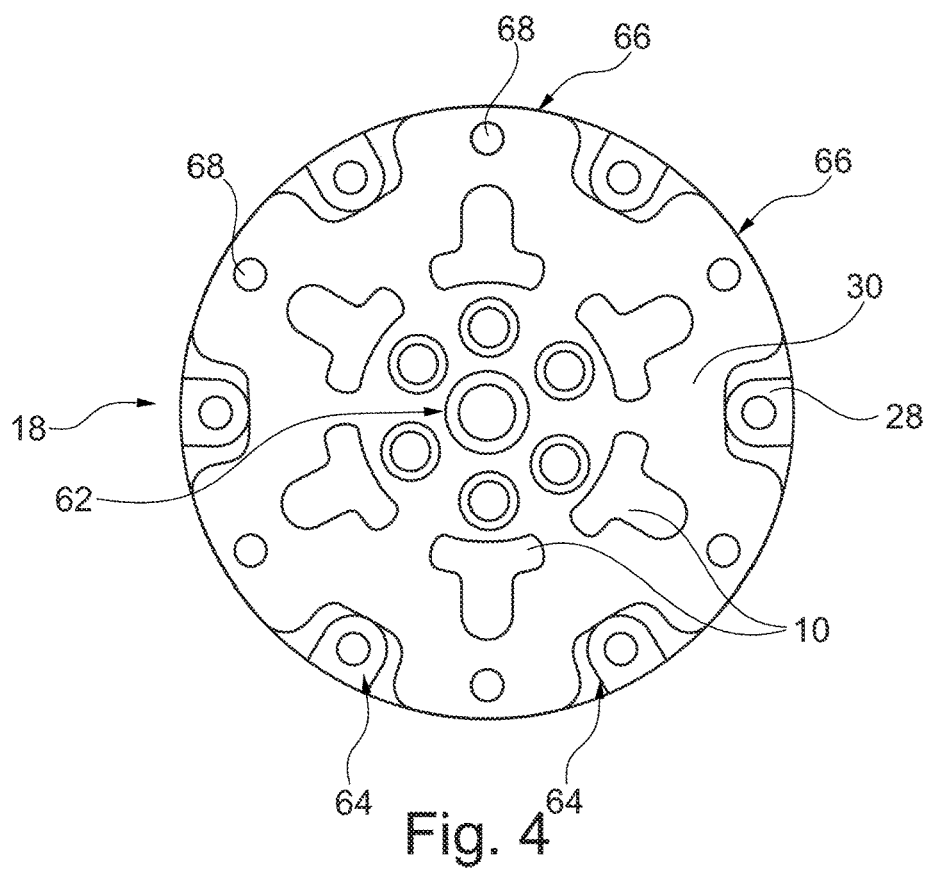
FIG. 4 is a plan view of an exemplary joint of the articulating portion of FIG. 2.

FIG. 4 illustrates a plan view of the joint 18 from a perspective axially above the connection plate 30. The connection plate 30 is connected to a rotatable internal component of the body 28 (as will be described below) by one or more fasteners 62. In an exemplary embodiment, the connection plate 30 is configured to be secured to the connection portion 50 of the connector arm 20. The connection plate 30 may include a perimeter shape that matches the perimeter shape of the connector arm 30. For example, the connection plate 30 may include a plurality of concave sections 64 alternating with a plurality of convex sections 66. The plurality of convex sections 66 include openings 68 for being aligned with openings in the attachment members 56 and receiving a fastener therethrough. During operation, the joint 18 is actuatable to rotate the connection plate 30, thereby rotating the connected arm portion 20.

Figure 5:
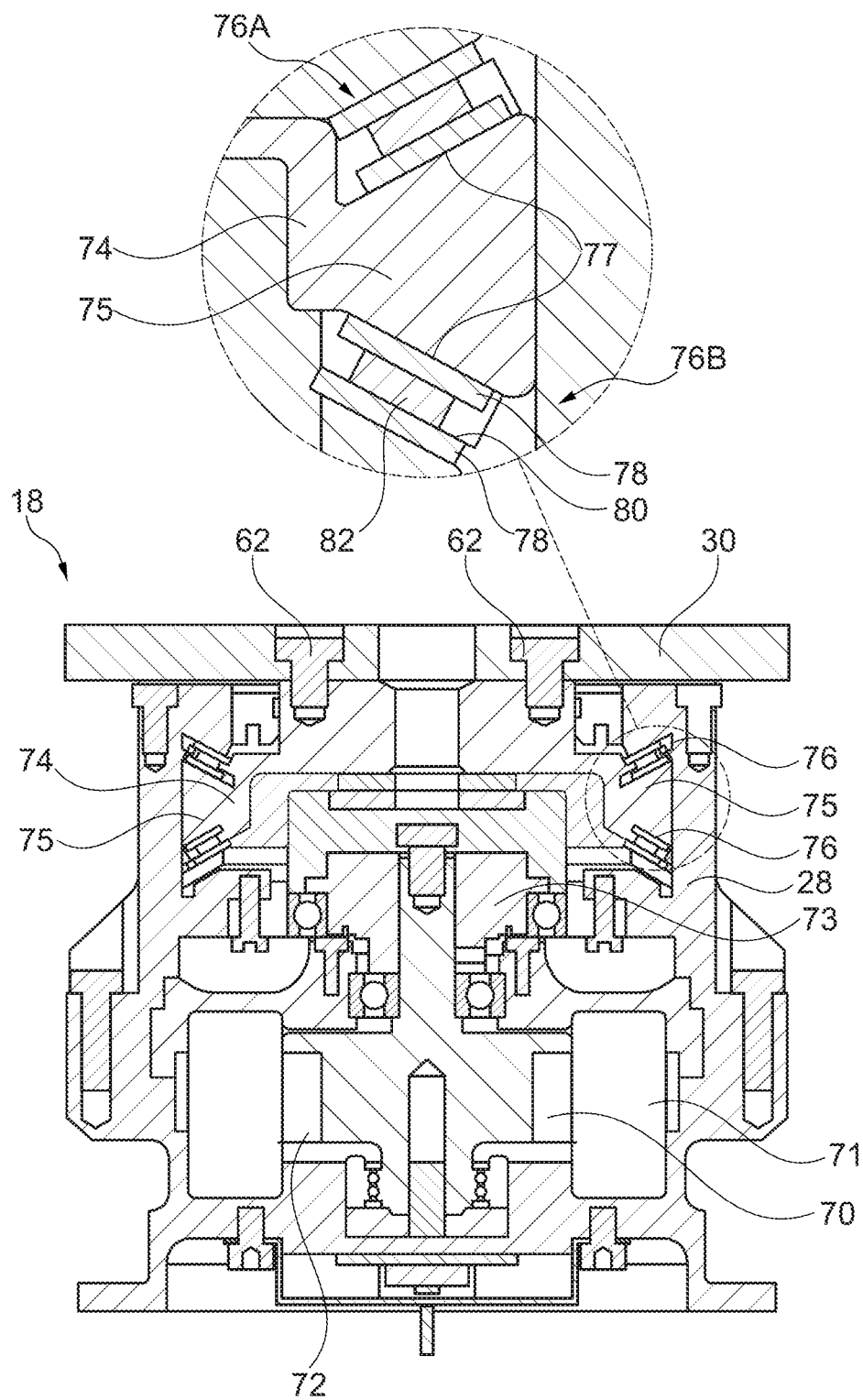
FIG. 5 is a cross-sectional view of the joint of FIG. 4.

FIG. 5 is a cross-sectional view of an exemplary actuatable joint 18 depicting the internal components thereof. In an exemplary embodiment, the joint 18 includes a motor 70, a gearbox 73, an output shaft 74, and a bearing assembly 76. The motor 70 may be, for example, a compact frameless motor integrated into the housing 28. In other embodiments, the motor 70 may be a housed motor, such as a brushed DC motor, a brushless DC motor, a stepper motor, or an induction motor. In an exemplary embodiment, the motor 70 includes a stator 71 and a rotor 72. The rotor 72 is operatively connected to the gearbox 73.

The motor 70 may produce rotational motion to rotate one or more components of the inline gearbox 73, which, in turn, causes rotation of the output shaft 74. The output shaft 74 is secured to the connection plate 30 by the one or more fasteners 62 to thereby rotate the connection plate 30 (and the connector arm 20, if connected).

In an exemplary embodiment, the output shaft 74 includes a generally frusto-conical section 75 which defines a pair of frusto-conical support surfaces 77. The bearing assembly 76 supports the output shaft 76 and gearbox 74 in order to allow for reliable rotation of the connection plate 30 by the motor 70. Consistent with disclosed embodiments, the bearing assembly 76 includes a pair of axial angular contact roller bearings 76A, 76B.

As shown in FIG. 5, each bearing 76A, 76B includes a pair of bearing rings 78, a bearing cage 80, and a plurality of rollers 82. The bearing rings 78 of each bearing 76A, 76B are thin and frusto-conical, and form a pair of parallel races which are angled to also be parallel to a respective one of the frusto-conical support surfaces 77. In this way, a corresponding bearing ring 78 of each bearing 76A, 76B may be positioned on one of the two opposing support surfaces 77 of the output shaft 74. Moreover, the bearing rings 78 form races that are angled with respect to a plane perpendicular to an axis of rotation of the output shaft 74. In comparing the two bearings 76A, 76B to each other, the corresponding pairs of races are angled toward each other in a radially inward direction, corresponding to the shape of the frusto-conical section 75.

The bearing cage 80 may be formed from an injection-molded material (e.g., plastic) and be shaped to fit within an angled space defined by the bearing rings 78. In other embodiments, the bearing cage 80 may be formed from another type of material, such as brass, sheet steel, or fiber glass. The bearing cage 80 includes a plurality of openings for receiving the rollers 82. The rollers 82 are depicted as cylindrical bearing rollers, but may include a different shape (e.g., spherical or tapered needles).

The above axial angular contact roller bearings provide high load carrying capacity with taking up only a small cross-sectional area. This allows the envelope size and weight of each joint to remain relatively small without sacrificing carrying capacity. This further contributes to the modular, replaceable, and customizable aspects of the disclosed articulating assembly 14 and robotic system 10.

Having thus described the presently preferred embodiments in detail, it is to be appreciated and will be apparent to those skilled in the art that many physical changes, only a few of which are exemplified in the detailed description of the invention, could be made without altering the inventive concepts and principles embodied therein. It is also to be appreciated that numerous embodiments incorporating only part of the preferred embodiment are possible which do not alter, with respect to those parts, the inventive concepts and principles embodied therein. The present embodiments and optional configurations are therefore to be considered in all respects as exemplary and/or illustrative and not restrictive, the scope of the invention being indicated by the appended claims rather than by the foregoing description, and all alternate embodiments and changes to this embodiment which come within the meaning and range of equivalency of said claims are therefore to be embraced therein.

PARTS LIST

10. Robotic System
12. Base Portion
14. Articulating Assembly
16. Base Bracket
18. Actuatable Joint
20. Connector Arm
22. Bracket
24. Horizontal Axis
26. Vertical Axis
28. Body
30. Connection Plate
32. Connection Plate
34. Body Portion
35. First End
36. Second End
38. Length
40. First Attachment Surface
42. Second Attachment Surface
44. Axial Base Member
46. Perimeter Wall
48. Web
50. Connection Portion
52. Concave Section
54. Convex Section
56. Attachment Member
58. Channel
60. Cable
62. Fastener
64. Concave Section
66. Convex Section
68. Opening
70. Motor
71. Stator
72. Rotor
73. Gearbox
74. Output Shaft
75. Frusto-conical Section
76. Bearing Assembly
76A. Axial Angular Contact Roller Bearing
76B. Axial Angular Contact Roller Bearing
77. Frusto-conical Support Surface
78. Bearing Ring
80. Bearing Cage
82. Roller

What is claimed is:

1. An actuatable joint for a robotic system, comprising:
   a body;
   a motor positioned in the body;
   an output shaft configured to be rotated by the motor relative to the body and having a pair of opposite support surfaces that are oblique relative to each other; and
   a bearing assembly positioned between the output shaft and the body and configured to support the rotation of the output shaft,
   wherein the bearing assembly includes a first axial angular contact roller bearing, including:
      a pair of generally frusto-conical bearing rings forming a pair of parallel races, wherein one of the bearing rings is positioned on one of the support surfaces,
      a bearing cage positioned between the pair of bearing rings and including a plurality of openings, and
      a plurality of rollers positioned in the openings and in contact with the races.

2. The actuatable joint of claim 1, wherein the output shaft includes a generally frusto-conical section defining the pair of support surfaces.

3. The actuatable joint of claim 2, wherein the bearing assembly includes a second axial angular contact roller bearing having a bearing ring positioned on the other of the support surfaces of the output shaft.

4. The actuatable joint of claim 3 wherein the pair of parallel races of the first axial angular contact roller bearings are angled toward a pair of races of the second axial angular contact roller bearing in a radially inward direction.

5. The actuatable joint of claim 1, wherein the bearing cage is formed from a molded plastic material.

6. The actuatable joint of claim 1, wherein the plurality of rollers are cylindrical.

7. The actuatable joint of claim 1, wherein the actuatable joint further includes an inline gearbox between the motor and the output shaft.

8. The actuatable joint of claim 1, wherein the actuatable joint further includes a connector plate secured to the output shaft.

9. The actuatable joint of claim 1, wherein the opposing oblique support surfaces are defined by a generally frusto-conical section of the output shaft that is located at a radially outer extent of the output shaft.

10. A robotic system, comprising:
a connector arm; and
an actuatable joint, including
    a body;
    a motor positioned in the body;
    an output shaft configured to be rotated by the motor relative to the body, the output shaft including a section defining a pair of opposite support surfaces that are oblique relative to a rotational axis of the output shaft;
    a connector plate secured to the output shaft; and
    a bearing assembly positioned between the output shaft and the body and configured to support the rotation of the output shaft,
wherein the bearing assembly includes a first axial angular contact roller bearing and a second axial angular contact roller bearing, each including:
    a pair of generally frusto-conical bearing rings forming a pair of parallel races, one of the bearing rings being in contact with one of the support surfaces,
    a bearing cage positioned between the pair of bearing rings and including a plurality of openings, and
    a plurality of rollers positioned in the openings and in contact with the races,
wherein the connector arm is attached to the connector plate for rotation by the motor.

11. The robotic system of claim 10, further including a second actuatable joint connected to the actuatable joint by the connector arm.

12. A modular robotic system, comprising:
modular components, including
    a connector arm,
    a connector plate,
    wherein perimeters of the modular components each have a toothed geometrical configuration defined by a plurality of concave sections and a plurality of convex sections, and
    wherein the modular components each have an internal channel and a plurality of attachment members or openings; and
an actuatable joint, including
    a body,
    a motor positioned in the body,
    an output shaft configured to be rotated by the motor relative to the body, the output shaft including a section defining a pair of generally frusto-conical support surfaces, and
    a bearing assembly positioned between the output shaft and the body and configured to support the rotation of the output shaft, having a first axial angular contact roller bearing positioned on one of the support surfaces.

* * * * *